US006293463B1

(12) United States Patent
Kato et al.

(10) Patent No.: US 6,293,463 B1
(45) Date of Patent: Sep. 25, 2001

(54) ELECTRONIC PRICE LABEL BATTERY STORAGE APPARATUS AND REPLACEMENT METHOD

(75) Inventors: Shuzo Kato; Yoshitaka Utsumi; Osamu Takagi, all of Kanagawa (JP)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/250,858

(22) Filed: Feb. 17, 1999

(51) Int. Cl.[7] ................................................. G06K 15/00
(52) U.S. Cl. ................................................ 235/383; 429/96
(58) Field of Search ................................. 235/383, 454; 429/163, 170, 100, 99; 340/825.17, 825.34

(56) References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,039,580 | * 8/1991 | Mori et al. | 429/99 |
| 5,129,546 | * 7/1992 | Thielmann | 221/66 |
| 5,172,314 | 12/1992 | Poland et al. | 364/401 |
| 5,448,226 | 9/1995 | Failing, Jr. et al. | 340/825.35 |
| 5,504,475 | 4/1996 | Houdou et al. | 340/825.35 |
| 5,771,005 | * 6/1998 | Goodwin, III | 340/825.17 |
| 6,031,585 | * 2/2000 | Stevens, III | 235/383 |
| 6,042,962 | * 3/2000 | Ling | 429/99 |

FOREIGN PATENT DOCUMENTS

61250965A * 11/1986 (JP) .

OTHER PUBLICATIONS

Patent Abstracts of Japan, vol. 011, No. 099, Mar. 27, 1987, and JP 61 250965.
Patent Abstracts of Japan, vol. 016, No. 475, Oct. 2, 1992, and JP 04 171655.

\* cited by examiner

Primary Examiner—Karl D. Frech
Assistant Examiner—Larry D Taylor
(74) Attorney, Agent, or Firm—Paul W. Martin (57) ABSTRACT

An electronic price label battery storage apparatus and replacement method which maintains power to a memory within the electronic price label during removal and replacement of batteries. The battery storage apparatus includes a first electrical contact for simultaneously providing a first electrical path to first polarity sides of a plurality of batteries within the electronic price label, a second electrical contact for simultaneously providing a second electrical path to second polarity sides of the plurality of batteries, and a retainer which maintains at least a single one of the batteries in contact with the first and second electrical contacts during removal of other batteries to maintain power to the memory within the electronic price label.

2 Claims, 8 Drawing Sheets

ELECTRONIC PRICE LABEL BATTERY STORAGE APPARATUS AND REPLACEMENT METHOD

BACKGROUND OF THE INVENTION

The present invention relates to electronic price labels (EPLs), and more specifically to an electronic price label battery storage apparatus and replacement method.

EPL systems typically include a plurality of EPLs for merchandise items in a transaction establishment. EPLs typically display the prices of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs further include a memory for storing information, such as serial numbers and prices. The memory is typically a volatile memory, such as random access memory (RAM). Thus, EPLs further include a power source for maintaining the contents of the memory. The power source is typically a battery.

However, removal and replacement of the battery causes loss of memory contents. Reprogramming the EPL with a serial number and other critical data after battery replacement is a labor intensive, error prone, and costly process.

Therefore, it would be desirable to provide an electronic price label battery storage apparatus and replacement method which preserve the contents of the memory during battery replacement.

SUMMARY OF THE INVENTION

In accordance with the teachings of the present invention, an electronic price label battery storage apparatus and replacement method is provided.

The electronic price label battery storage includes a first electrical contact for simultaneously providing a first electrical path to first polarity sides of a plurality of batteries within the electronic price label, a second electrical contact for simultaneously providing a second electrical path to second polarity sides of the plurality of batteries, and a retainer which maintains at least a single one of the batteries in contact with the first and second electrical contacts during removal of other batteries to maintain power to a memory within the electronic price label.

The method of replacing batteries in an electronic price label includes retaining at least a single one of first batteries in the electronic price label to maintain power to a memory in the electronic price label, removing a first number of the first batteries other than the single one battery from the electronic price label, and inserting a second number of second batteries into the electronic price label.

It is accordingly an object of the present invention to provide an electronic price label battery storage apparatus and replacement method.

It is another object of the present invention to provide an electronic price label battery storage apparatus and replacement method which preserves the contents of a volatile memory.

It is another object of the present invention to provide an electronic price label battery storage apparatus and replacement method which is low in cost.

It is another object of the present invention to provide an electronic price label battery storage apparatus and replacement method which employ two batteries.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
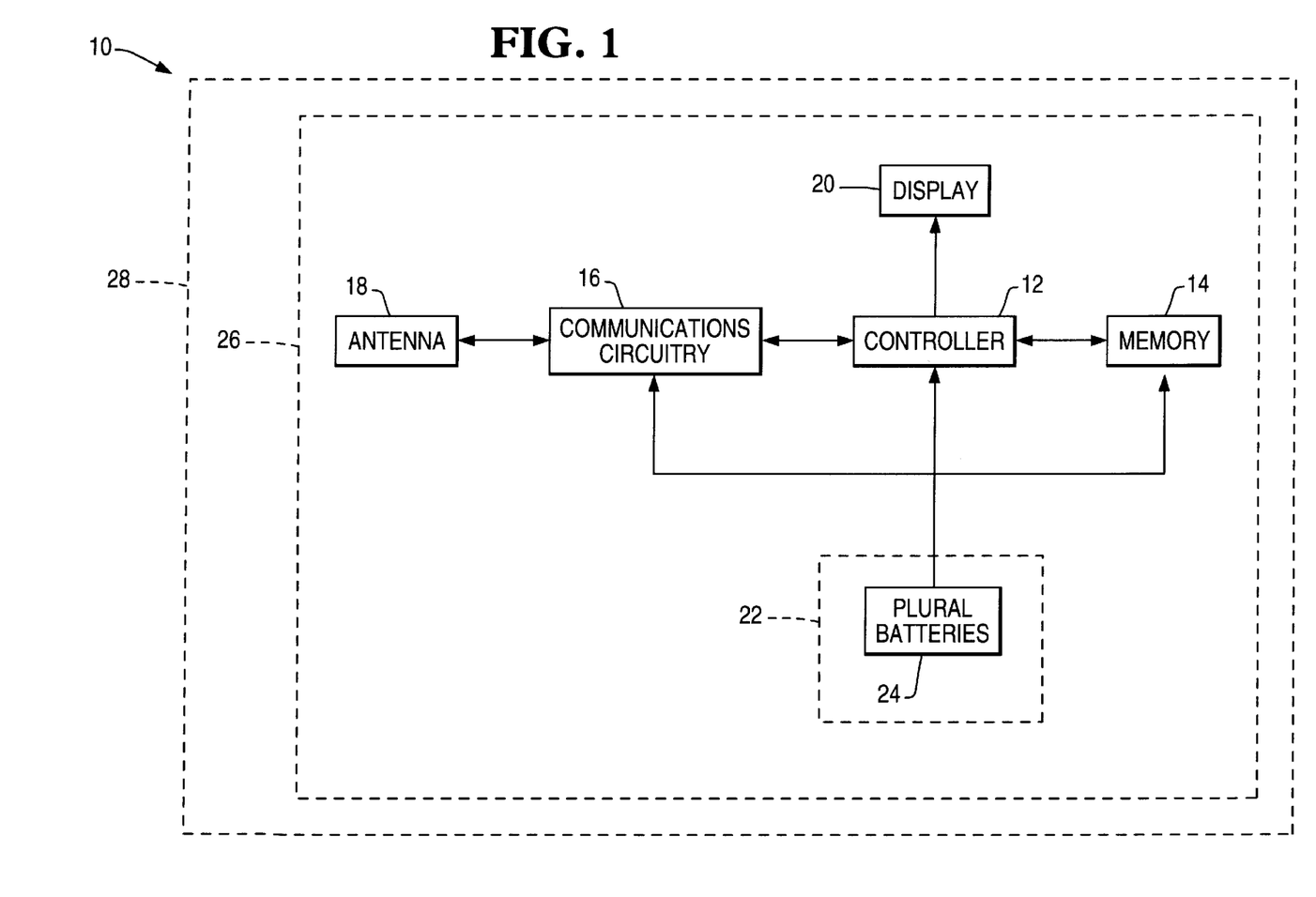
FIG. 1 is a block diagram of an EPL including the battery storage apparatus.

Referring to FIG. 1, EPL 10 includes housing 28 which contains printed circuit board 26. Mounted to printed circuit board are controller 12, memory 14, communications circuitry 16, antenna 18, display 20, and battery storage apparatus 22.

Controller 12 controls operation of EPL 10. Controller 12 processes commands from a host system, stores display information in memory 14, and controls display of the display information in accordance with commands from the host system. Display information may include price information, promotional information, and other information a store may wish to display. Controller 12 also stores identification information during initialization of the EPL. The identification information preferably includes a serial number and any additional information which is necessary address messages to EPL 10.

Memory 14 stores the display information and the identification information and is preferably a volatile random access memory, such as a static random access memory (SRAM).

Communications circuitry 16 receives messages from the host system and returns acknowledgments to the host system.

Antenna 18 works with communications circuitry 16 if EPL 10 communicates wirelessly.

Display 20 displays display information and is preferably a liquid crystal display (LCD).

Battery storage apparatus 22 stores plural batteries 24. Battery storage apparatus 22 includes door 60 (FIGS. 3A–3B, 4A–4C) which facilitates easy external access to batteries 24, as well as simultaneous removal of some batteries and retention of other batteries, in order to preserve the contents of memory 14.

Turning now to FIGS. 2A–2B and 3A–3B, battery storage apparatus 22 is shown in more detail.

Figure 2A:
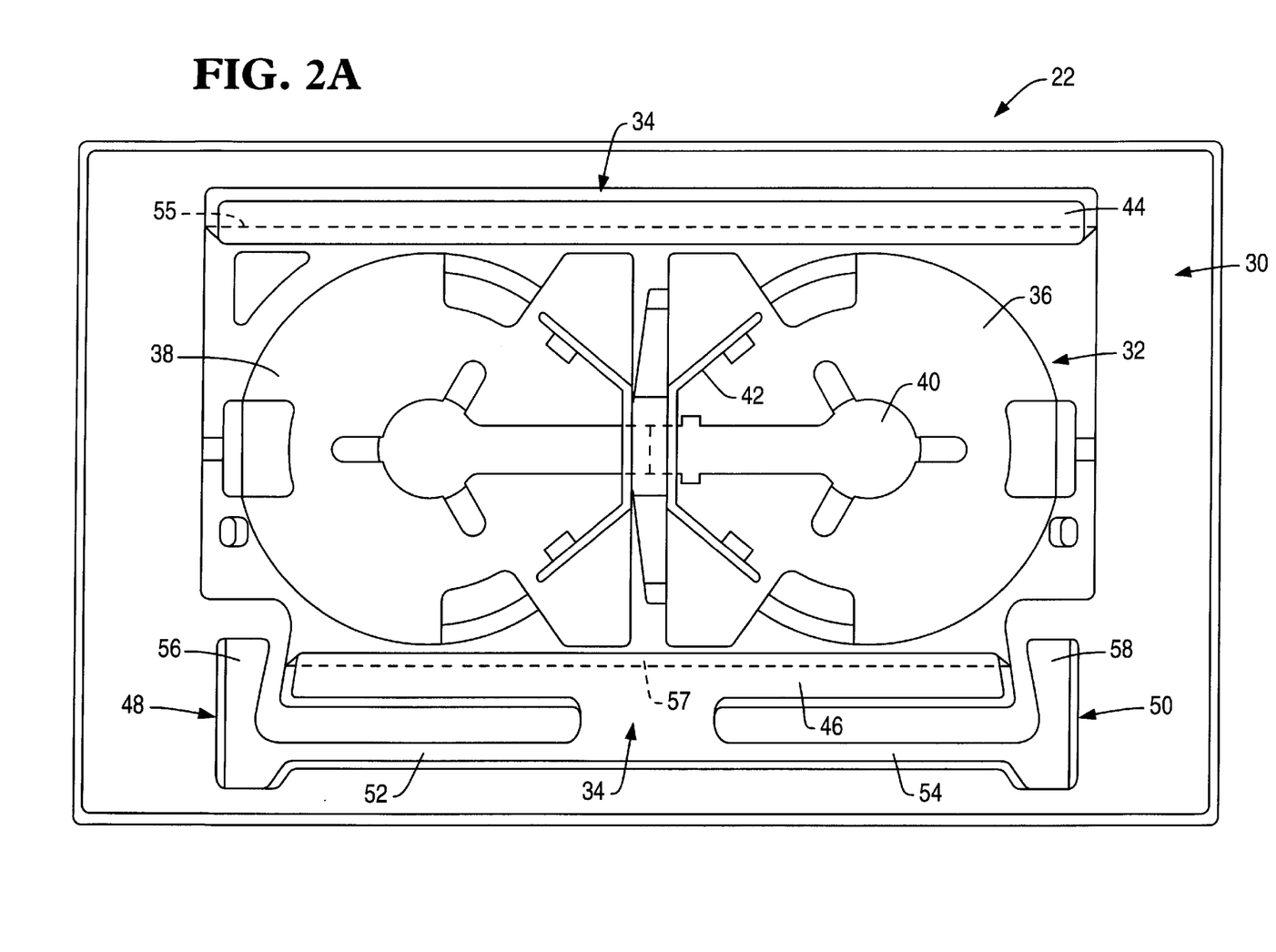
FIG. 2A is a front view of the battery storage apparatus without a door.
Figures 2B, 3B:
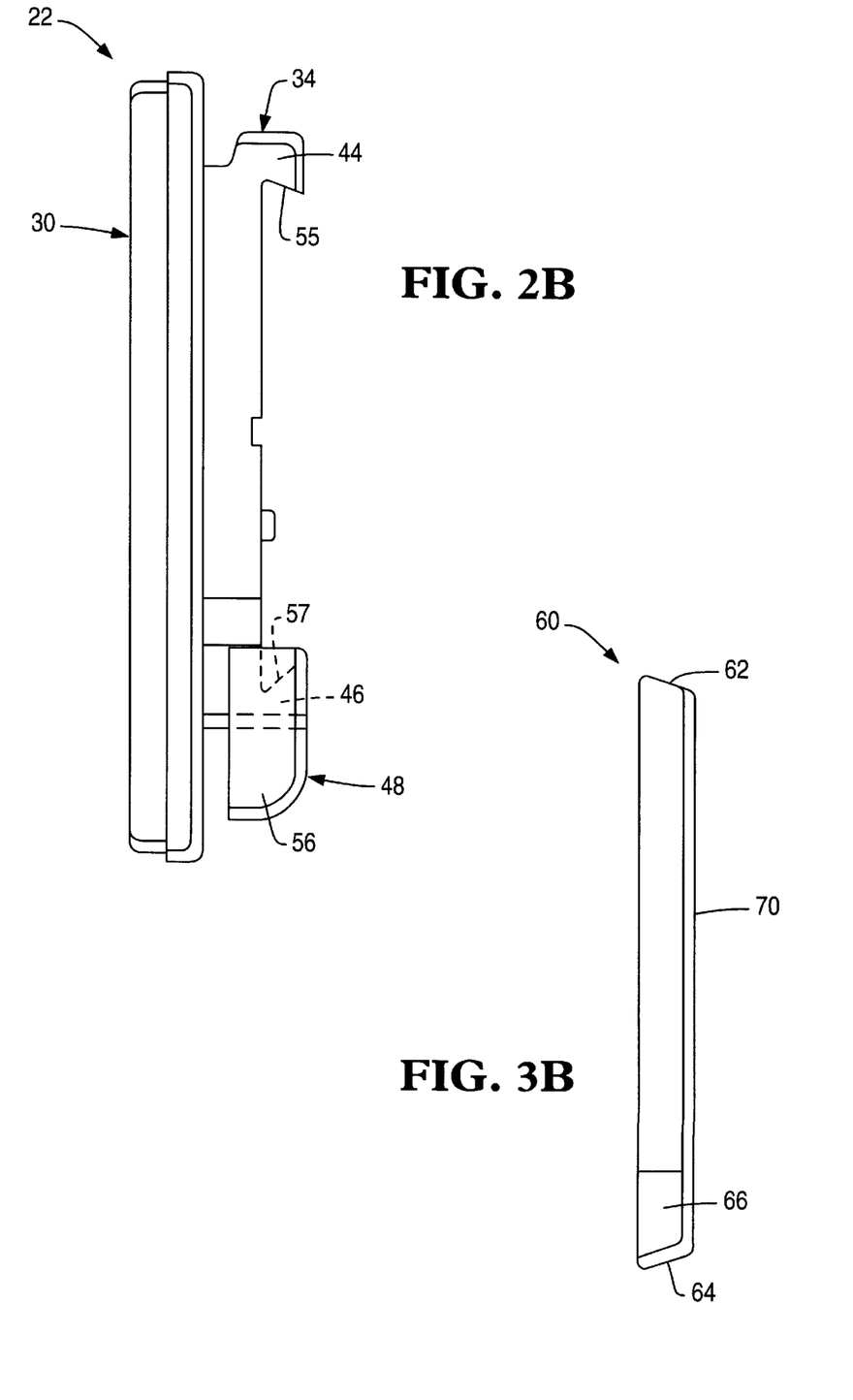
FIG. 2B is a left side view of the battery storage apparatus without the door.
FIG. 3B is a left side view of the door.
Figure 3A:
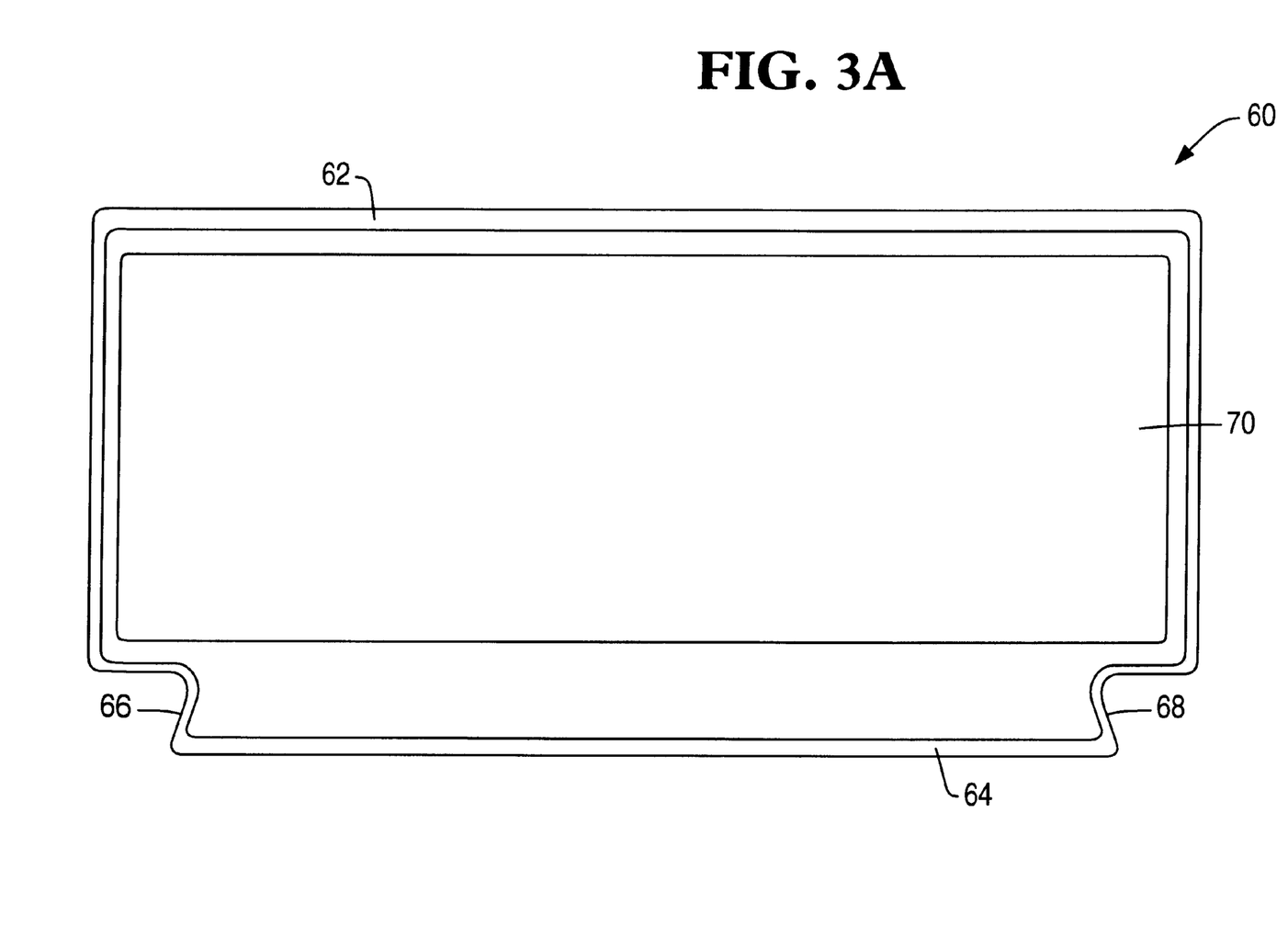
FIG. 3A is a front view of the door.

Battery storage apparatus 22 includes support member 30, battery storage well 32, door retaining portion 34, and door 60 (FIGS. 3A–3B).

Support member 30 provides a foundation for battery storage well 32 and door retaining portion 34. Support member 30 may serve as a back wall of housing 28 or may be attached to an existing back wall through a mounting aperture.

Battery storage well 32 is recessed within support member 30 and has a depth sufficient to ensure that batteries 24 do not extend outside of well 32. In this manner, the outside surfaces of batteries 24 are approximately flush-mounted with the outside surface of support member 30. This design facilitates use of sliding door 60.

As illustrated, battery storage well 32 includes two battery storage chambers 36 and 38, although other designs involving additional chambers are also envisioned by the present invention. Battery storage chambers 36 and 38 are generally circular in shape and include electrical contacts 40 and 42.

In this design, electrical contact 40 contacts the inside surface of batteries 24 and is a negative contact. Electrical contact 42 contacts the sides of batteries 24 and is a positive contact. Both electrical contacts 40 and 42 have some flexibility and are normally-biased to ensure good contact is maintained with batteries 24.

Electrical contacts 40 and 42 are also designed to minimize the possibility of a short circuit condition during the battery replacement process. Electrical contact 42 is located on one side of each battery 24 which is opposite to the side being removed first. Further, removal of a battery 24 draws that battery away from electrical contact 42.

Door retaining portion 34 retains sliding door 60. Door retaining portion 34 includes upper and lower door tracks 44 and 46 and left and right door locks 48 and 50.

With reference to FIG. 2B, upper and lower door tracks 44 and 46 include inclined guide surfaces 52 and 54 which retain door 60. For this purpose, upper guide surface 52 inclines upwardly from the outer surface of upper door track 44 and lower guide surface 54 inclines downwardly from the outer surface of lower door track 46. Both upper and lower door tracks 44 and 46 are open-ended to allow door 60 to be inserted from either the left or right side and to slide in both left and right directions.

Left and right door locks 48 and 50 include spring members 52 and 54 and latches 56 and 58.

Latches 56 and 58 engage door 60 to prevent door 60 from moving left or right.

Spring members 52 and 54 connect to the center of lower door track 46. Spring members 52 and 54 bias latches 56 and 58 towards a normally-locked position, but can be bent by an application of downward pressure on latches 56 and 58.

Advantageously, the door retaining features of the prevention invention minimize the chance of accidental opening of door 60 during handling of EPL 10 by store personnel, including dropping of EPL 10.

With reference to FIGS. 3A and 3B, door 60 is generally planar and rectangular in shape. Door 60 includes inclined top and bottom edges 62 and 64. Edges 62 and 64 are inclined at angles similar to those of surfaces 52 and 54 of upper and lower door tracks 44 and 46. For this purpose, upper edge 62 inclines upwardly from outer surface 70 of door 60 and lower edge 64 inclines downwardly from outer surface 70 of door 60.

Door 60 also includes latching surfaces 66 and 68 which are generally J-shaped. Latches 56 and 58 engage latching surfaces 66 and 68 when door 60 is closed to prevent left and right movement of door 60.

Door also presses against batteries 24 to ensure good electrical contact between batteries 24 and electrical contact 40.

Figure 4A:
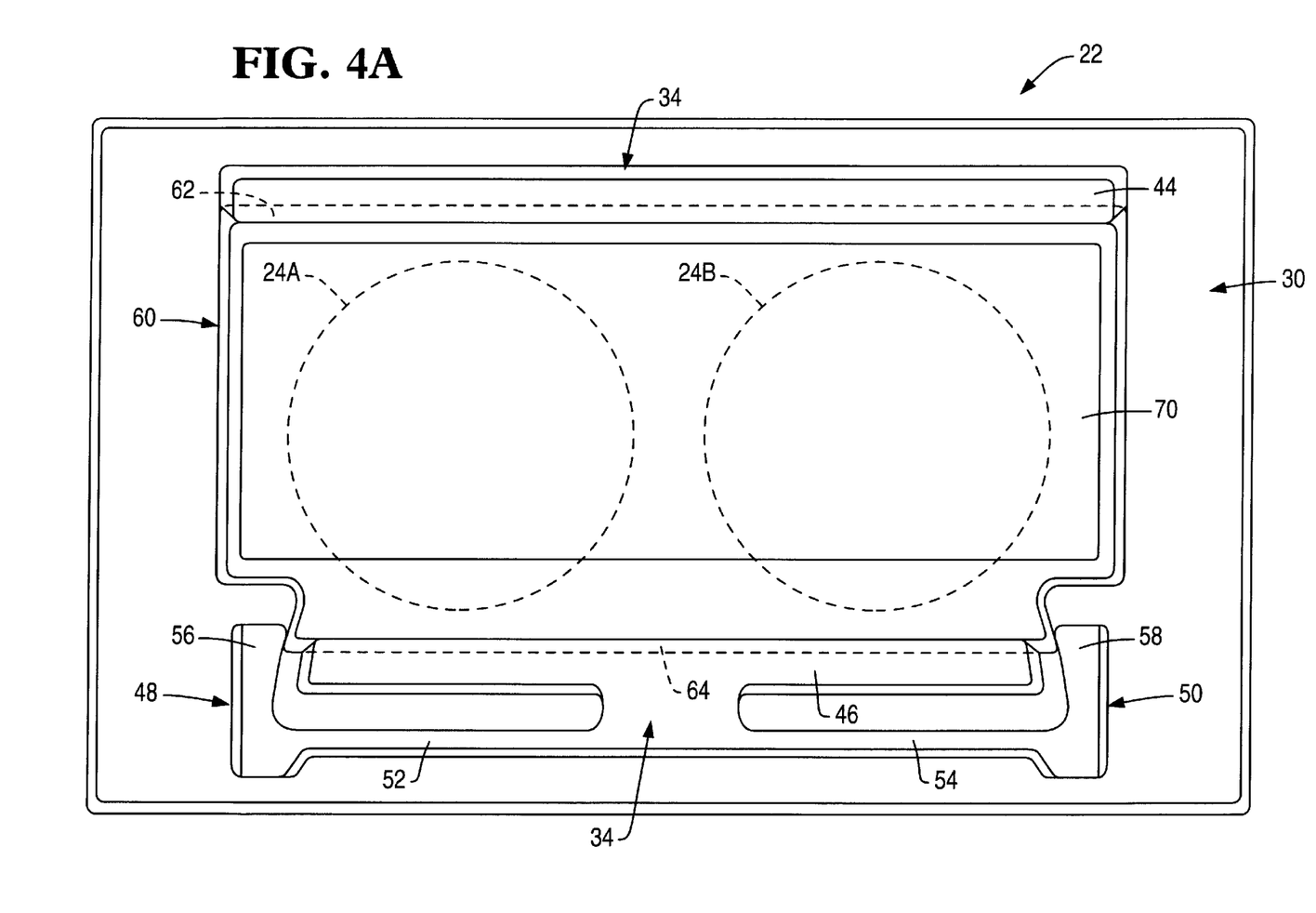
FIG. 4A is a front view of the battery storage apparatus with the door fully closed.
Figure 4B:
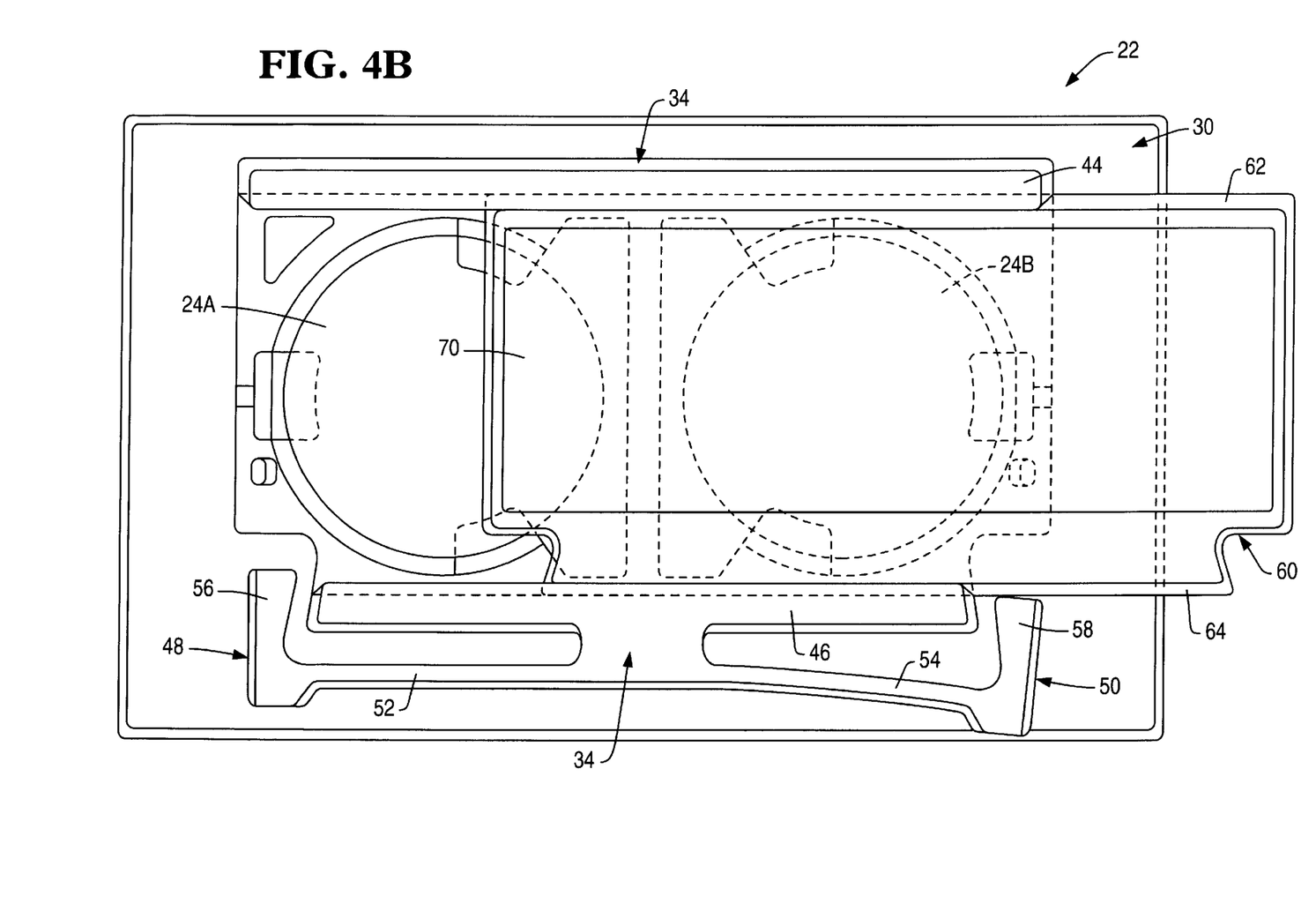
FIG. 4B is a front view of the battery storage apparatus with the door partially opened to replace a first battery.
Figure 4C:
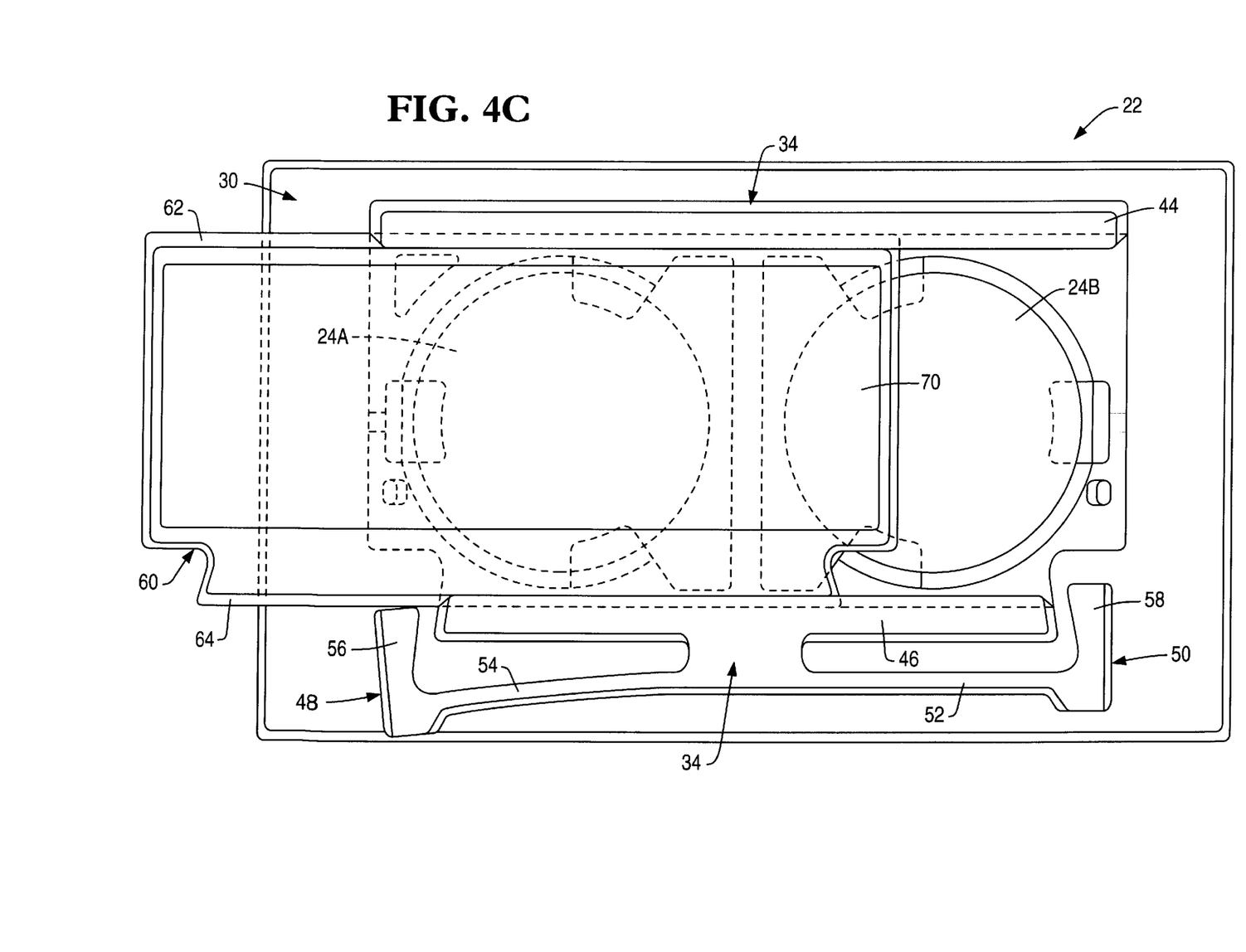
FIG. 4C is a front view of the battery storage apparatus with the door partially opened to replace a second battery.

Referring now to FIGS. 4A–4C, operation of battery storage apparatus 22 is shown in more detail. Removal and replacement of batteries 24 is accomplished by accessing and removing batteries 24 in a manner that leaves at least one battery in place during the procedure.

In FIG. 4A, door 60 is in a closed position with batteries 24A and 24B inside. Door 60 is held in the closed position by latches 56 and 58.

In FIG. 4B, latch 50 is lowered and door 60 is slid to the right to expose battery 24A. Battery 24A is removed and replaced. Door 60 is opened only about half way in order to ensure that battery 24B is still providing power during removal and replacement of battery 24A. Following replacement of battery 24A, door 60 is slid to the left, allowing latch 50 to return to its normally-biased position.

In FIG. 4C, latch 48 is lowered and door 60 is slid to the left to expose battery 24B. Battery 24B is removed and replaced. Door 60 is opened only about half way in order to ensure that battery 24A is still providing power during removal and replacement of battery 24B. Following replacement of battery 24B, door 60 is slid to the right towards a centered position, allowing latch 48 to return to its normally-biased position.

Figure 5:
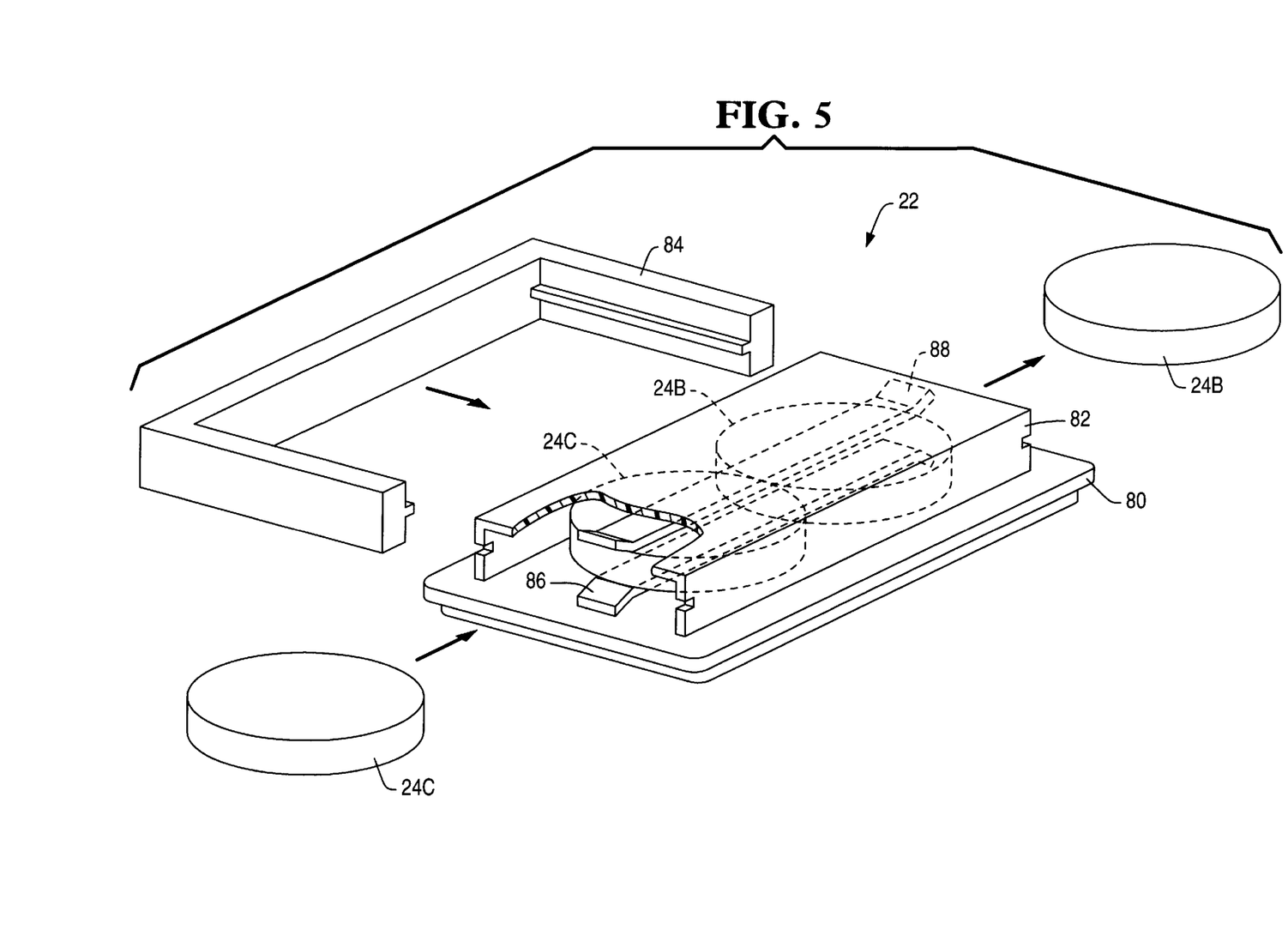
FIG. 5 is a perspective view of a battery storage apparatus in accordance with a second embodiment of the present invention.

Turning now to FIG. 5, a second embodiment of battery storage apparatus 22 includes support member 80, tunnel 82, and lock 84.

Support member 80 attaches to a back surface of EPL 10. Support member 80 may serve as a back wall of housing 28 or may be attached to an existing back wall through a mounting aperture.

Battery electrical contact 86 fastens to support member 80.

Tunnel 82 extends from support member 80. Tunnel 82 is generally U-shaped and includes enough room for at least two batteries 24A and 24B. Battery electrical contact 88 fastens to the ceiling of tunnel 82.

Lock 84 includes first and second doors which slide across tunnel 82 to simultaneously close both ends of tunnel 82.

The battery change operation begins by removing lock 84 from tunnel 82. Battery 24C is inserted into tunnel 82 at one end of tunnel 82 so as to push battery 24B out of tunnel 82 at the other end. Battery 24A remains in contact with electrical contacts 86 and 88 during sliding. Battery 24A may be removed in a similar fashion using an additional replacement battery. After batteries 24A and 24B have been pushed out of tunnel 82 by replacement batteries, lock 84 is replaced over the ends of tunnel 82.

In the first embodiment, door 60 maintains at least one of batteries 24 in place. In the second embodiment, tunnel 82 maintains at least one of batteries 24 in place.

Although the present invention has been described with particular reference to certain preferred embodiments thereof, variations and modifications of the present invention can be effected within the spirit and scope of the following claims. For example, other designs including more than two batteries 24 are also envisioned by the present invention, such as a line of batteries, a matrix of batteries, or any other geometric arrangement which allows at least one battery to provide power during removal of one or more of the other batteries. Also, not all batteries need be removed and not all batteries removed need be replaced.

What is claimed is:

1. A electronic price label comprising:

a housing;

circuitry within the housing including a volatile memory; and a battery storage apparatus within the housing including
a first electrical contact for simultaneously providing a first electrical path to first polarity sides of a plurality of batteries;
a second electrical contact for simultaneously providing a second electrical path to second polarity sides of the plurality of the batteries; and
a retainer which maintains at least a single one of the batteries in contact with the first and second electrical contacts during removal of a number of other batteries in order to maintain power to the memory including a tunnel on a rear surface of the housing containing the first and second electrical contacts, having a first end aperture through which a new battery is inserted, having a second end aperture through which an old battery is ejected during insertion of the new battery, a first door adjacent the first end aperture, and a second door linked to the first door adjacent the second end aperture.

2. A electronic price label comprising:

a housing;

circuitry within the housing including a volatile memory; and a battery storage apparatus within the housing including
a first electrical contact for simultaneously providing a first electrical path to first polarity sides of a plurality of batteries;
a second electrical contact for simultaneously providing a second electrical path to second polarity sides of the plurality of the batteries; and
a retainer which maintains at least a single one of the batteries in contact with the first and second electrical contacts during removal of a number of other batteries in order to maintain power to the memory including a tunnel on a rear surface of the housing containing the first and second electrical contacts, having a first end aperture through which a new battery is inserted, having a second end aperture through which an old battery is ejected during insertion of the new battery a first sliding door adjacent the first end aperture, a second sliding door adjacent the second end aperture, and a linking member joining the first and second sliding doors to facilitate substantially simultaneous closure of the first and second sliding doors.

* * * * *